US009025074B2

(12) United States Patent
Kishi

(10) Patent No.: US 9,025,074 B2
(45) Date of Patent: May 5, 2015

(54) IMAGE CAPTURING APPARATUS AND METHOD FOR CONTROLLING THE SAME

(71) Applicant: Canon Kabushiki Kaisha, Tokyo (JP)

(72) Inventor: Takafumi Kishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/146,341

(22) Filed: Jan. 2, 2014

(65) Prior Publication Data

US 2014/0192249 A1  Jul. 10, 2014

(30) Foreign Application Priority Data

Jan. 7, 2013  (JP) .................................. 2013-000732

(51) Int. Cl.
*H04N 5/232* (2006.01)
*H04N 9/64* (2006.01)
*H04N 5/367* (2011.01)
*H04N 5/369* (2011.01)

(52) U.S. Cl.
CPC ........... *H04N 5/23212* (2013.01); *H04N 5/367* (2013.01); *H04N 5/3696* (2013.01)

(58) Field of Classification Search
USPC ............... 348/349, 354, 345, 246, 247, 222.1
See application file for complete search history.

(56) References Cited

U.S. PATENT DOCUMENTS

| 8,804,027 | B2* | 8/2014 | Ichimiya ........................ 348/349 |
| 2008/0317454 | A1* | 12/2008 | Onuki ......................... 348/222.1 |
| 2012/0176532 | A1* | 7/2012 | Hara .............................. 348/352 |
| 2012/0212654 | A1* | 8/2012 | Nagata ........................... 348/247 |
| 2013/0265295 | A1* | 10/2013 | Ogawa ........................... 345/214 |
| 2014/0146218 | A1* | 5/2014 | Kunieda et al. ............... 348/345 |
| 2014/0198239 | A1* | 7/2014 | Suzuki et al. ................. 348/246 |

FOREIGN PATENT DOCUMENTS

| JP | 2001-083407 A | 3/2001 |
| JP | 2001-250931 A | 9/2001 |
| JP | 2004-134867 A | 4/2004 |
| JP | 3592147 B | 11/2004 |

* cited by examiner

*Primary Examiner* — Nhan T Tran
(74) *Attorney, Agent, or Firm* — Cowan, Liebowitz & Latman, P.C.

(57) ABSTRACT

An image capturing apparatus comprises: an image sensor that includes a plurality of pixels, each including a plurality of photoelectric conversion elements; a readout unit that reads out a signal from a portion of the photoelectric conversion elements of each pixel as a first signal and reads out a sum of signals from the plurality of photoelectric conversion elements of each pixel as an image signal; a generation unit that generates a second signal for each pixel using the image signal and the first signal; and a calculation unit that calculates a moving amount of a focus lens for achieving an in-focus state based on a phase difference between the first signal and the second signal. The calculation unit performs the calculation without using a signal from a defective line.

8 Claims, 15 Drawing Sheets

IN-FOCUS

FRONT-FOCUS

REAR-FOCUS

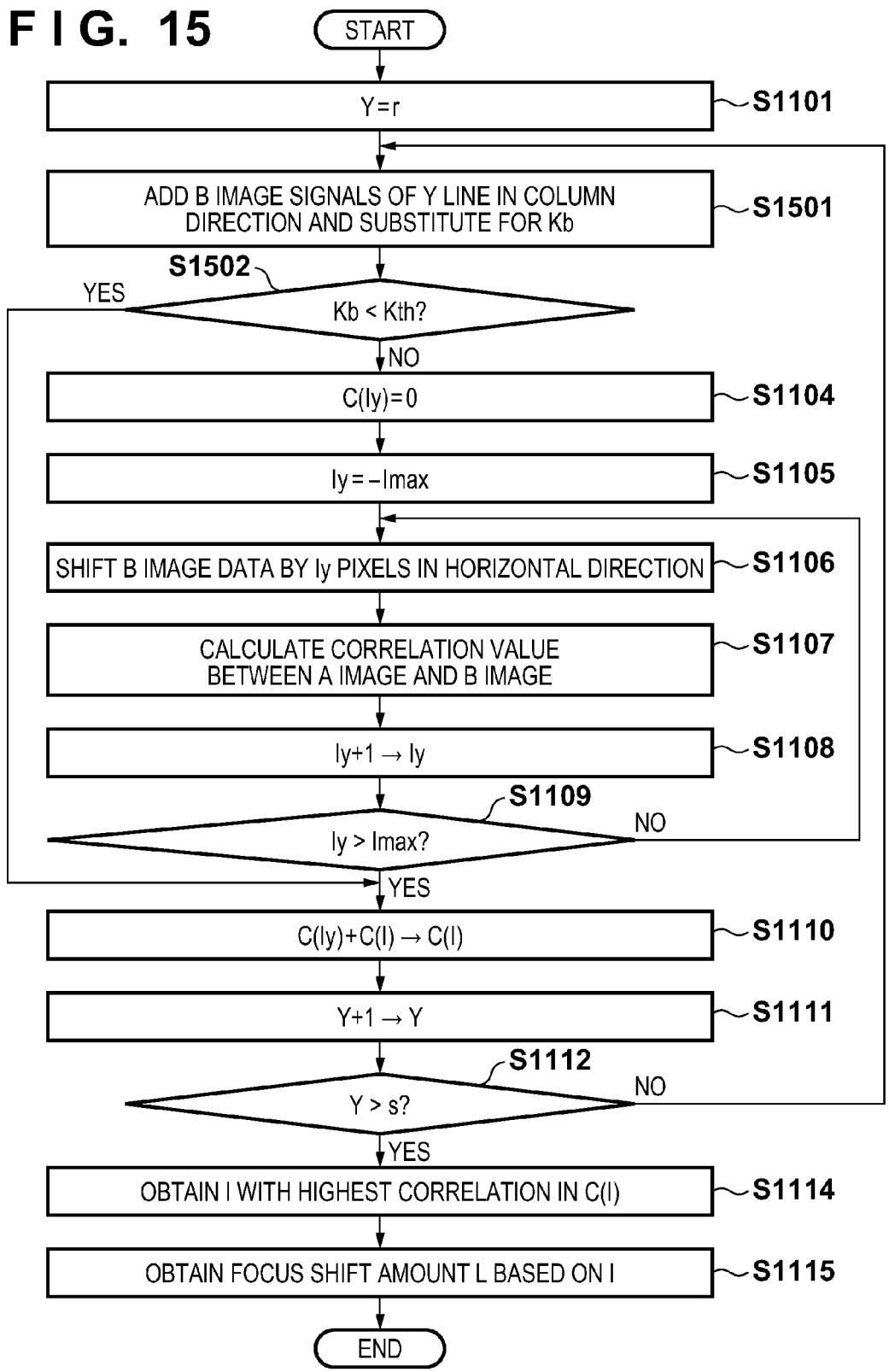

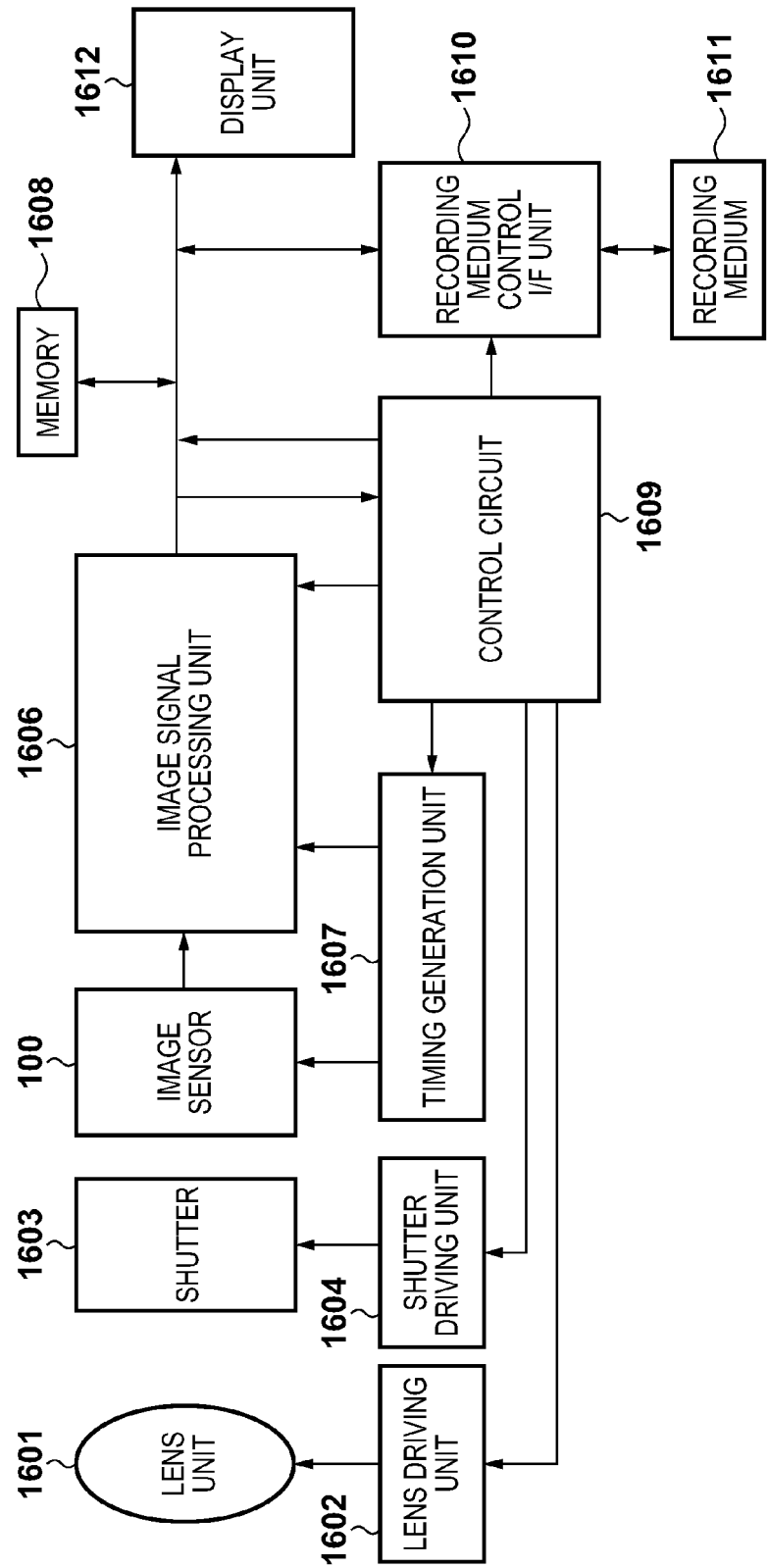

IMAGE CAPTURING APPARATUS AND METHOD FOR CONTROLLING THE SAME

BACKGROUND OF THE INVENTION

1. Field of the Invention

The present invention relates to an image capturing apparatus and a method for controlling the same, and more specifically relates to an image capturing apparatus that performs focus detection using signals from pixels capable of receiving light that passes through different pupil areas of an imaging lens, and a method for controlling the same.

2. Description of the Related Art

Conventionally, there are techniques for focus detection using a phase difference method at the same time as imaging by means of a configuration in which the pixels in an image sensor receive light that has passed through a different pupil area of an imaging lens. Japanese Patent Laid-Open No. 2001-083407 and Japanese Patent Laid-Open No. 2001-250931 disclose configurations in which, by providing photodiodes (PD) for receiving light collected by one micro-lens in a pixel, each photodiode receives light that passes through different pupil areas of an imaging lens. Also, Japanese Patent No. 03592147 discloses a configuration in which, by changing the wiring layer arranged in front of a PD depending on the pixel and changing the aperture of the PD, a pixel receives light that passes through different pupil areas of an imaging lens. With these techniques, an image shift amount is detected, or in other words, a phase difference is detected based on signals of PDs that have received light that has passed through different pupil areas of an imaging lens, a focus shift amount is calculated based on the image shift amount, and focus detection is performed.

In the case of an image capturing apparatus that detects a phase difference using an image sensor, it is preferable that the image shift amount detection area is two-dimensional rather than one-dimensional. This is because if the detection area is comprised of only one line, the width of a detection area in the line direction is of the pixel pitch of the image sensor and too narrow. However, in the case of using a two-dimensional detection area, if a defective line containing consecutive defective pixels in the column direction is included among the lines in the detection area, this will generate a deviation in the results of the phase difference detection and the accuracy of the phase difference detection will decrease.

On the other hand, in the case of using an image sensor having two divided PDs per micro-lens, it takes twice the amount of read-out time to individually read out signals from the two PDs. Japanese Patent Laid-Open No. 2004-134867 discloses a method for reading out signals from two lines of PDs at a high speed using two readout circuits. Specifically, a reset signal is read out, and thereafter the first PD signal is read out, and a second PD signal is read out on top of the first PD signal. Thus, it is possible to obtain the second PD signal by subtracting the first PD signal from the added sum signal of the two PDs, and an increase in speed is realized by reducing the number of reset signal readout times. This technique can provide an increase in speed even in the case where signals are read out individually from PDs, from an image sensor having the above-mentioned configuration in which two divided PDs correspond to one micro-lens.

In the case of detecting a phase difference using an image sensor, a signal obtained by adding two PD signals together can be used as the image signal and signals obtained by reading out two PD signals separately can be used for the phase difference detection. In these readout methods, there may be a case in which the signal obtained by adding the two PD signals of a pixel is normal, but the individual PD signals are defective. Specifically, this happens when two PD signals are read out in combination with each other due to a defect that occurs when the first PD signal is to be read out. In this case, two PD signals are read out at the time of reading out the first PD signal, and two image signals are obtained at the time of reading out the image signal obtained by adding the first and second PD signals together as well. In other words, this results in not being able to obtain the first PD signal as well as the second PD signal even if the first PD signal is subtracted from the added PD signals.

Thus, even though there is no defective line in the captured image when reading out the two PD signals at a high speed, it is possible for a defective line to appear in the image that is to be used for phase difference detection. If there is a defect in the image for phase difference detection, the accuracy of the phase difference detection will decrease as stated above. A defective line in an image for viewing is normally treated as a product defect. But in this case, although there is no defective line in the image for viewing, the image sensor is treated as a product defect because there is a defective line in the image for phase difference detection and the yield will be reduced.

SUMMARY OF THE INVENTION

The present invention has been made in consideration of the above situation, and enables phase difference detection without generating a deviation and prevents a reduction in the yield of the image sensor in the case where a defective line is present in an image for phase difference detection but not in an image for viewing.

According to the present invention, provided is an image capturing apparatus comprising: an image sensor that includes a plurality of pixels, each including a plurality of photoelectric conversion elements, and is capable of separately reading out signals by divided portions of the plurality of photoelectric conversion elements; a readout unit configured to read out a signal from a portion of the photoelectric conversion elements of each pixel as a first signal and read out a sum of signals from the plurality of photoelectric conversion elements of each pixel as an image signal; a generation unit configured to generate a second signal for each pixel, using the image signal and the first signal; and a calculation unit configured to calculate a moving amount of a focus lens included in an imaging lens for achieving an in-focus state, based on a phase difference between the first signal and the second signal, wherein the calculation unit performs the calculation without using a signal from a defective line that includes a pixel that cannot generate the second signal using the image signal and the first signal.

According to the present invention, provided is a method for controlling an image capturing apparatus including an image sensor that includes a plurality of pixels, including a plurality of photoelectric conversion elements, and is capable of separately reading out signals separately by divided portions of the plurality of photoelectric conversion elements, the method comprising: a readout step of reading out a signal from a portion of the photoelectric conversion elements of each pixel as a first signal and reading out a sum of signals from the plurality of photoelectric conversion elements of each pixel as an image signal; a generation step of generating a second signal for each pixel, using the image signal and the first signal; and a calculation step of calculating a moving amount of a focus lens included in an imaging lens for achieving an in-focus state, based on a phase difference between the first signal and the second signal, wherein in the calculation step, the calculation is performed without using a signal from a defective line that includes a pixel that cannot generate the second signal using the image signal and the first signal.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 15 is a flowchart illustrating focus detection calculation according to the second embodiment; and FIG. 16 is a block diagram showing a schematic configuration of an image capturing apparatus according to a third embodiment.

DESCRIPTION OF THE EMBODIMENTS

Exemplary embodiments of the present invention will be described in detail in accordance with the accompanying drawings.

First Embodiment

Figure 1:
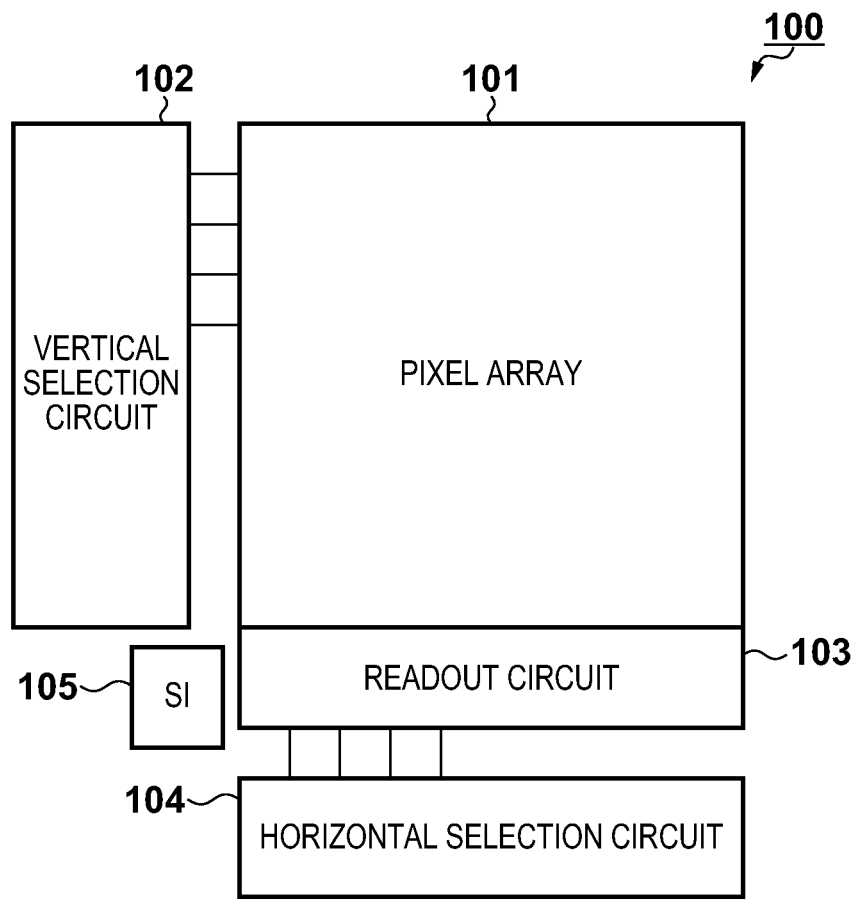
FIG. 1 is a diagram schematically illustrating an overall configuration of an image sensor according to an embodiment of the present invention.

A first embodiment of the present invention will be described below with reference to the drawings. FIG. 1 is a diagram showing an overview of an image sensor 100 according to the first embodiment. The image sensor 100 in FIG. 1 includes a pixel array 101 in which multiple pixels are arrayed two-dimensionally, a vertical selection circuit 102 for selecting lines in the pixel array 101, and a horizontal selection circuit 104 for selecting columns in the pixel array 101. Also, the image sensor 100 may include a readout circuit 103 that reads out signals from a pixel selected by the vertical selection circuit 102 from among the pixels in the pixel array 101, and a serial interface (SI) 105 for determining the operation mode and the like of circuits from an external device. The readout circuit 103 has a memory that temporarily accumulates signals, a gain amp, an A/D converter, and the like. Normally, the vertical selection circuit 102 selects multiple lines of the pixel array 101 in order and reads them out to the readout circuit 103. Multiple pixel signals that have been read out to the readout circuit 103 are sequentially selected by the horizontal selection circuit 104 in units of columns.

Note that in addition to the illustrated constituent elements, the image sensor 100 may include, for example, a control circuit or a timing generator for providing timing signals for the vertical selection circuit 102, the horizontal selection circuit 104, the readout circuit 103, and the like.

Figure 2:
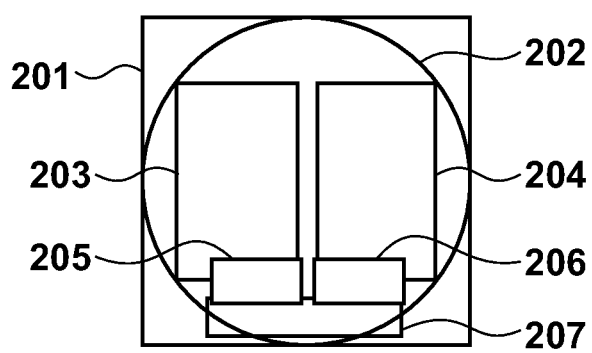
FIG. 2 is a diagram schematically illustrating one pixel of an image sensor according to an embodiment.

FIG. 2 is a diagram showing an outline of a configuration of one pixel of the image sensor 100 according to the first embodiment. One pixel 201 has one micro-lens 202 and two photodiodes (PDs) 203 and 204 that serve as photoelectric conversion elements. Furthermore, the pixel 201 also has transfer switches 205 and 206 that read out signals from the PD 203 and the PD 204, and a floating diffusion (FD) 207 that temporarily accumulates signals from the PD 203 and the PD 204. In addition to the illustrated constituent elements, each pixel can include multiple constituent elements that will be described later.

Figure 3:
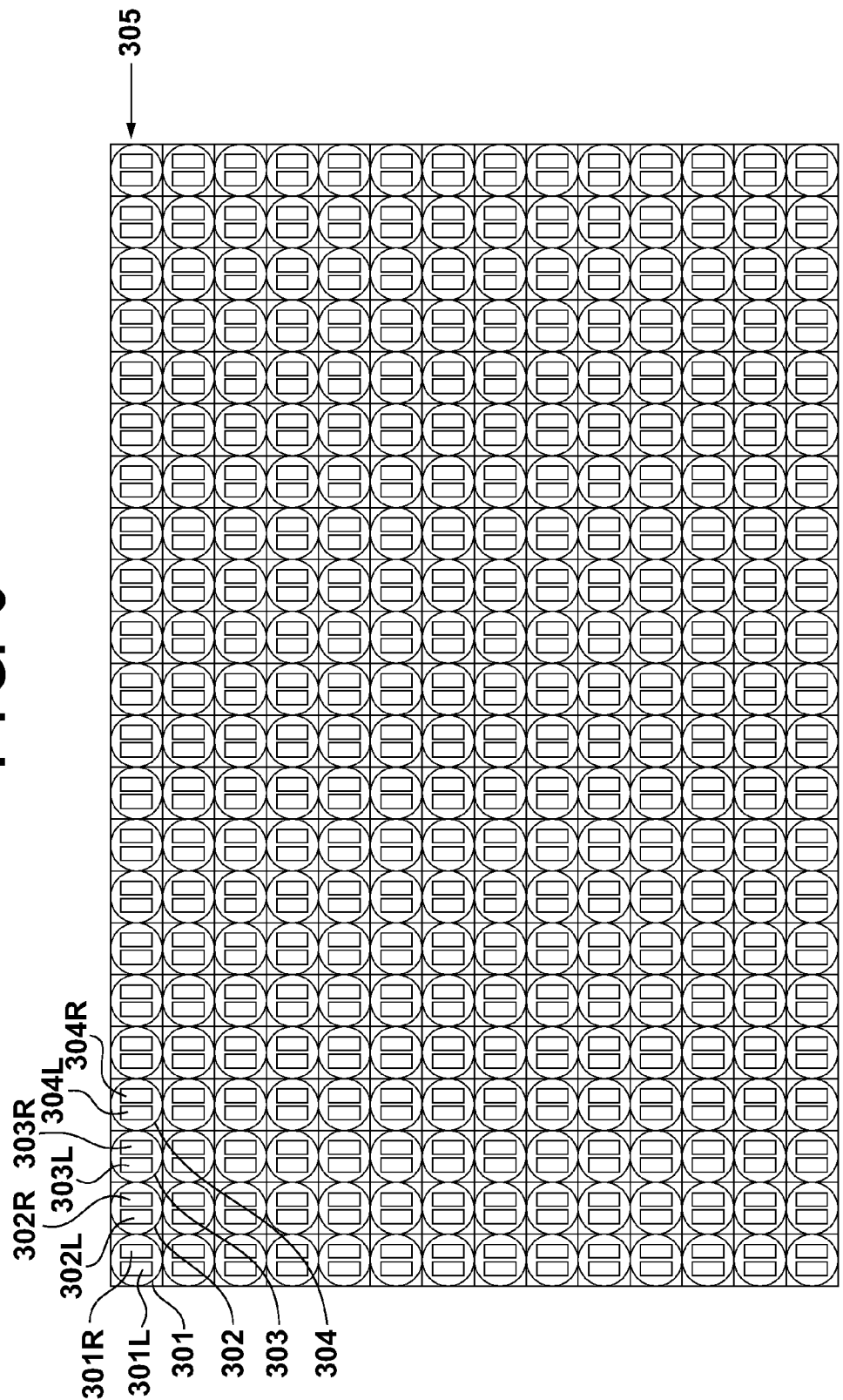
FIG. 3 is a plan view schematically illustrating a portion of a pixel array of an image sensor according to an embodiment.

FIG. 3 is a plan view schematically illustrating a portion of the pixel array 101. The pixel array 101 has a configuration in which a plurality of pixels such as that shown in FIG. 2 are aligned in a two-dimensional array in order to provide a two-dimensional image. To give a description using pixels 301, 302, 303, and 304 as examples, 301L, 302L, 303L and 304L correspond to the PD 203 in FIG. 2 and 301R, 302R, 303R, and 304R correspond to the PD 204 in FIG. 2.

Figure 4:
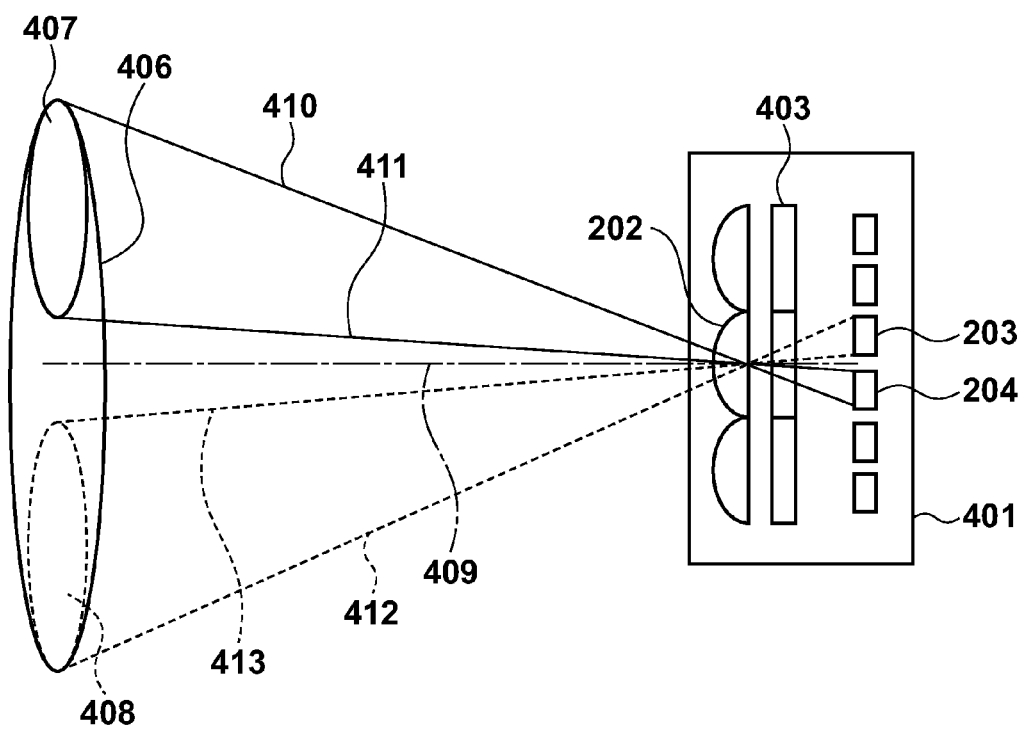
FIG. 4 is a schematic diagram showing a relationship between an exit pupil and light received by an image sensor.

The following describes light reception in the image sensor 100 that has a pixel array 101 such as that shown in FIG. 3, with reference to FIG. 4. FIG. 4 is a schematic diagram showing a state in which a luminous flux exiting the exit pupil of an imaging lens is incident on the image sensor 100.

In FIG. 4, reference numeral 401 indicates a cross-section of the pixel array 101. As shown in the cross-section 401, a color filter 403 is included in addition to the micro-lenses 202, the PDs 203, and the PDs 204. Also, the center of the luminous flux exiting an exit pupil 406 toward the pixel, including the micro-lens 202, arranged in the center of the pixel array 101 is an optical axis 409. The light, whose center is the optical axis 409, exiting the exit pupil 406 is incident on the image sensor 100. Reference numerals 407 and 408 indicate partial areas (pupil areas) of the exit pupil of the imaging lens. The outermost light beams that pass through the pupil area 407 are indicated by reference numerals 410 and 411, and the outermost light beams that pass through the pupil area 408 are indicated by reference numerals 412 and 413. As is evident from FIG. 4, with the optical axis 409 serving as a boundary, among the light beams exiting the exit pupil 406, those on the upper side are incident on the PD 204, and those on the lower side are incident on the PD 203. In other words, the PD 203 and the PD 204 each receive light that has passed through the separate pupil areas 407 and 408 of the exit pupil 406 of the imaging lens.

As shown in FIG. 3, in the case of using the pixels 301, 302, 303, and 304 included in line 305, an image that is obtained from the PDs 301L, 302L, 303L, and 304L, which correspond to the PD 203 that is located on one side of an area with respect to the optical axis 409 and receives a light beam emitted from one exit pupil, will be referred to as an "A image". Also, the signals of the A image will be referred to as "A image signal". Additionally, an image that is obtained from the PDs 301R, 302R, 303R, and 304R, which correspond to the PD 204 that is located on the other side of the area with respect to the optical axis 409 and receives light beams emitted from the other exit pupil, will be referred to as a "B image", and the signals of the B image will be referred to as "B image signal".

Figure 5:
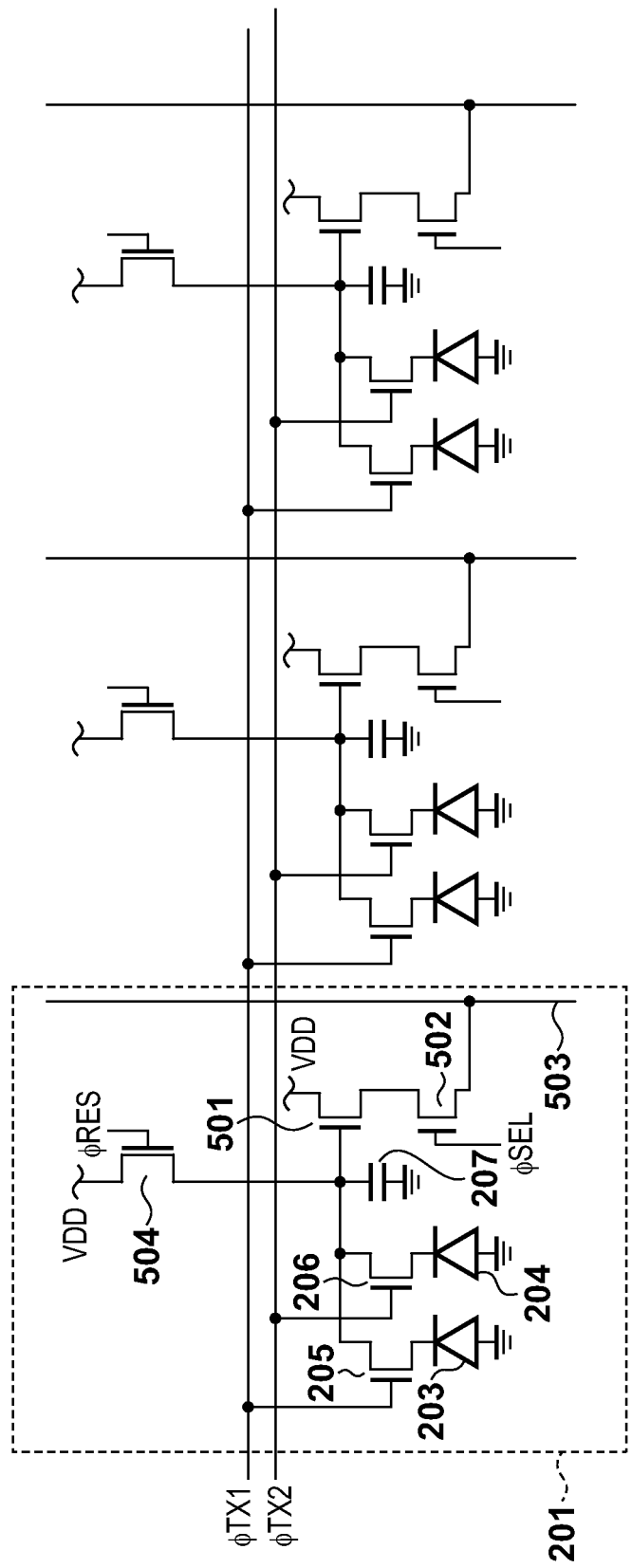
FIG. 5 is a circuit diagram for a pixel according to an embodiment.

FIG. 5 is an equivalent circuit diagram showing a circuit configuration of a pixel having the configuration shown in FIG. 2. Here, pixels in one line and three columns are illustrated schematically. In FIG. 5, elements that are the same as those in FIG. 2 are denoted by the same reference numerals. The transfer switches 205 and 206 in the pixel 201 are driven by transfer pulses φTX1 and φTX2 respectively and photo charges generated in the corresponding PDs 203 and 204 are transferred to the FD 207. The FD 207 plays the role of a buffer that temporarily stores a charge. Reference numeral 501 indicates an amplifying MOS amp that functions as a source follower, and reference numeral 502 indicates a selection switch for selecting a pixel using a vertical selection pulse ☐ SEL. A floating diffusion amp is configured by the FD 207, the amplification MOS amp 501, and a constant current source (not shown) that is connected to a vertical output line 503. The signal charge of the FD 207 of a pixel selected by the selection switch 502 is converted into a voltage by the floating diffusion amp, output to the vertical output line 503, and read out to the readout circuit 103. Reference numeral 504 indicates a reset switch that receives a reset pulse ☐ RES and resets the FD 207 using VDD.

As described above, the PD 203 and the PD 204 have the corresponding transfer switches 205 and 206 respectively, and share the circuitry used for signal readout from the FD 207 onward in the circuitry in the pixel. Due to having this kind of configuration, it is possible to achieve size reduction of each pixel. Also, the wiring that provides the transfer pulses ☐ TX1 and ☐ TX2 as illustrated in FIG. 5 is shared by pixels arranged in the same line.

Figure 6:
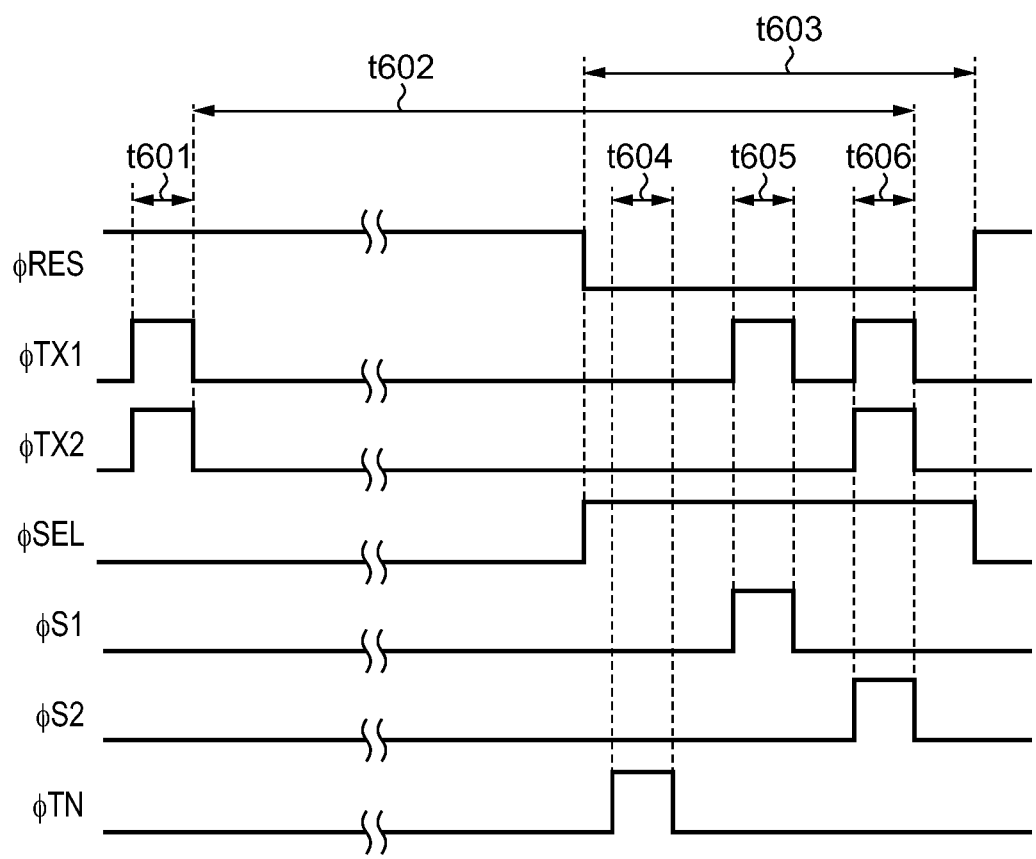
FIG. 6 is a timing chart showing a drive pattern for an image sensor according to an embodiment.

A method for driving the image sensor 100 having the above-described configuration will be described next. FIG. 6 is a timing chart showing a drive pattern, and it shows driving for reading out one line of signals to the readout circuit 103. First, during t601, the reset pulse ☐ RES and the transfer pulses ☐ TX1 and ☐ TX2 are set to a high voltage (hereinafter referred to as "H") at the same time. Accordingly, the reset switch 504 and the transfer switches 205 and 206 switch on, and the voltages of the PD 203, the PD 204, and the FD 207 are reset to the initial voltage VDD. Subsequently, when the transfer pulses ☐ TX1 and ☐ TX2 are set to a low voltage (hereinafter referred to as "L"), charge accumulation starts in the PD 203 and the PD 204.

Next, after the elapse of a predetermined amount of time that is determined based on the amount of time for charge accumulation, a readout line is selected due to the selection pulse ☐ SEL being set to H and the selection switch 502 switching on at t603, and a readout operation for one line of signals is performed. Additionally, the reset pulse ☐ RES is et to L simultaneously, the reset of the FD 207 is canceled.

During t604, ☐ TN is set to H, and an N signal, which is a reset level of the FD 207, is read out to the readout circuit 103 and recorded. Note that the readout circuit 103 reads out the voltage of the FD 207 via the vertical output line 503 and stores the read signal under control of ☐ TN, ☐ S1, and ☐ S2 pulses, although this is not shown in the drawing. Next, during t605, the transfer pulse ☐ TX1 and ☐ S1 are simultaneously set to H and the transfer switch 205 switches on, and thereby a first PD signal, which is a signal obtained by adding the light signal and noise signal of the PD 203 together, is recorded to the readout circuit 103.

Next, while the reset switch 504 is not on, the transfer pulses ☐ TX1, ☐ TX2, and ☐ S2 are simultaneously set to H and the transfer switches 205 and 206 switch on during t606. Accordingly, a second PD signal, which is a signal obtained by adding the light signal of the PD 203 and the light signal of the PD 204 and the noise signal together, is stored in the readout circuit 103. The transfer pulse ☐ TX 1 is switched on once during t605 and the signal of the PD 203 is read out to the FD 207, and therefore the transfer pulse ☐ TX1 may be in the off state during t606. Also, strictly speaking, the period of time from the end of t601 up to the end of t606 is the accumulation period t602. Note that the timing at which the transfer pulse ☐ TX2 is set to H to reset the PD 204 may be delayed by the time difference between t605 and t606.

An A image signal obtained by subtracting the noise signal from the first PD signal and a general image signal obtained by subtracting the noise signal from the second PD signal are output from the image sensor 100 based on the N signal, the first PD signal, and the second PD signal that were read out to the readout circuit 103 using the above operations. Since the general image signal is a composite of the signals of the PD 203 and the PD 204, it is possible to generate the B image signal by subtracting the A image signal from the general image signal.

The A image signal, B image signal, and general image signal can be obtained by the above-described operations, but a case will be considered in which the wiring of the transfer pulse ☐ TX1 and the wiring of the transfer pulse ☐ TX2 are shorted due to a manufacturing defect. At that time, it is assumed that the transfer pulse ☐ TX2 that is normally set to L during t605 is set to H. In such a case, it results in reading out the second PD signal in the operation for reading out the first PD signal. As for the second PD signal, it is not affected since the transfer pulses TX1 and ☐ TX2 are normally set to H at the same time when reading out the second PD signals. As a result, the general image signal is read out as usual in the line in which the wiring of the transfer pulse ☐ TX1 and the wiring of the transfer pulse ☐ TX2 were shorted, but the same signal is read out as the A image signal. Furthermore, there will be no B image signal obtained by subtracting the A image signal from the general image signal. In other words, a phenomenon will occur in which the A image signal and B image signal will be defective even though there is no problem in the general image signal of that line.

Figure 7:
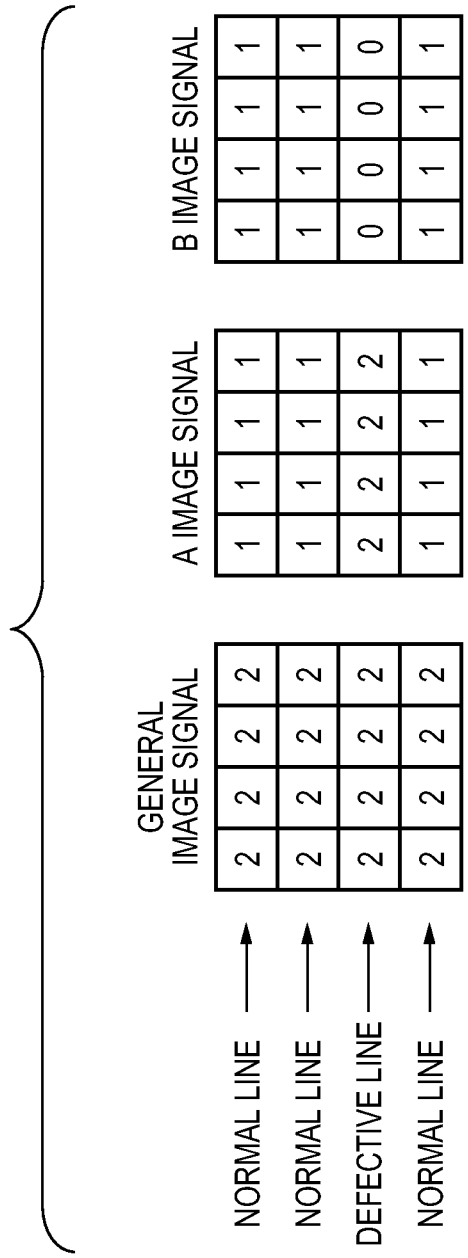
FIG. 7 is a diagram schematically illustrating a relationship between a defective line and output of A image signal and B image signal according to an embodiment.

FIG. 7 is a diagram schematically illustrating signal levels of an A image signal, and a B image signal. Here, it is assumed that only the third line in the arrangement of four lines and four columns is defective, and, if there is no defect, the general image signal has a level of 2, and the A image signal and the B image signal have a level of 1. Since the B image signal is obtained by subtracting the A image signal from the general image signal, in a normal line, the general image signal has a level of 2, and the A image signal has a level of 1, and therefore the B image signal has a level of 1. In the defective line, the general image signal has a normal level of 2, but the level of the A image signal is the same that of the general image signal, namely a level of 2, thus the B image signal becomes 0.

Figure 8:
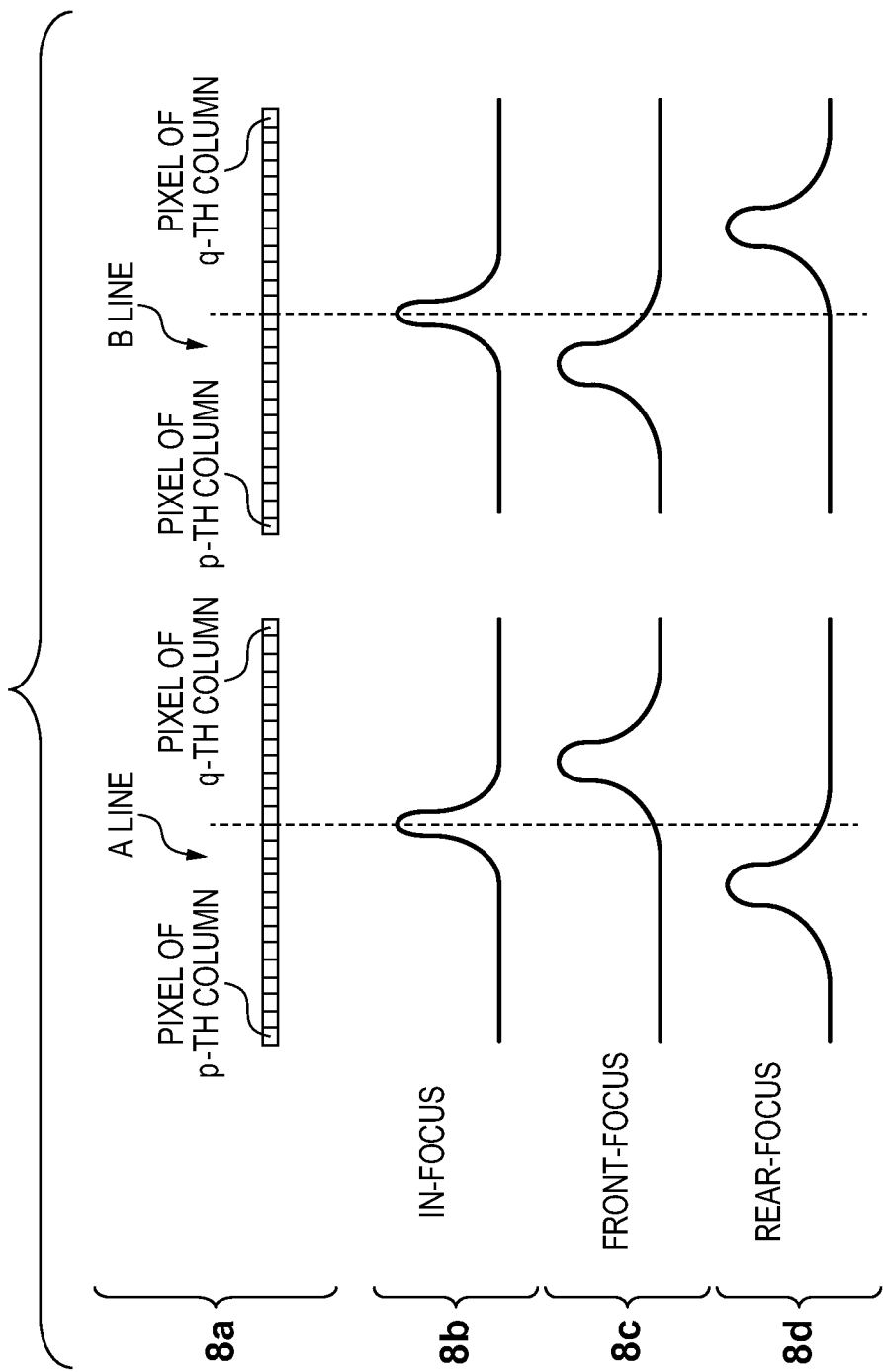
FIG. 8 is a diagram for schematically describing an overview of a phase difference type of focus detection method.

Next, with reference to FIG. 8, a description will be given of for an outline of a phase difference type focus detection method using characteristics according to which an image from different pupil areas of the exit pupil of the imaging lens is obtained in the image sensor 100. 8a in FIG. 8 shows a pixel group (A line) arranged in one line in order to obtain the A image signal, and a pixel group (B line) arranged in one line in order to obtain the B image signal. Further in FIG. 8, 8b shows an in-focus state, 8c shows a front-focus state, 8d shows a rear-focus state, and each shows an A image and a B image that were output from the A line and the B line, respectively.

As is evident from FIG. 8, the interval between the A image and B image is different depending on whether they are in an in-focus state, a front-focus state, or a rear-focus state. Using this fact, focusing is performed by moving the focus lens included in the imaging lens such that the image interval is at the interval of the in-focus state. In other words, the movement amount of the focus lens can be obtained by performing calculation based on the shift amount between the two images. However, in the case where the A image signal and the B image signal are acquired using the above-described method in the present embodiment, if there is a defective line such as that shown in FIG. 7, the A image will contain the wrong signal and the B image will contain no signal in the defective line, and therefore a problem will occur in that the shift interval between the two images cannot be calculated.

Figure 9:
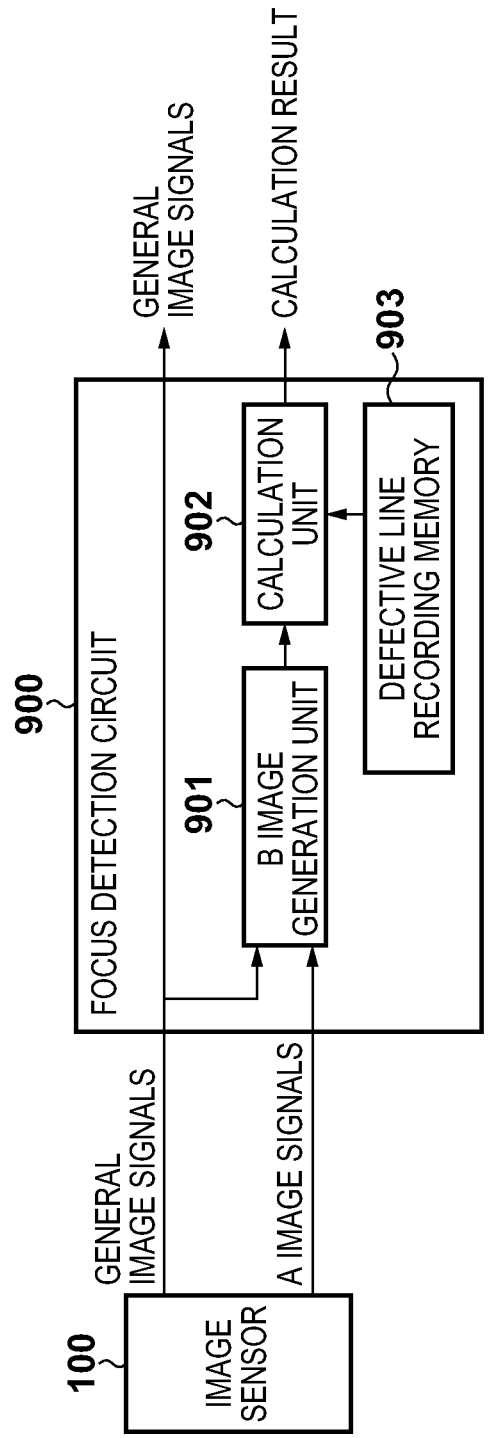
FIG. 9 is a block diagram showing a system configuration that includes an image sensor involved in focus detection according to a first embodiment.

A focus detection method with consideration given to the defective line will be described next. FIG. 9 is a system configuration diagram that includes the image sensor 100 that is involved in focus detection. The general image signal and the A image signal are output from the image sensor 100 as described above. The image signal and the A image signal from the image sensor 100 may be output at the same time or output in a time series. A focus detection circuit 900 generates the B image signal by subtracting the A image signal from the general image signal of the image sensor 100 using a B image generation unit 901. Additionally, the focus detection circuit 900 has a defective line recording memory 903 that records the address of the above-described defective line. Although a calculation for obtaining a shift amount from a later-described in-focus position is performed by a calculation unit 902 based on the A image signal and the B image signal, the calculation unit 902 does not perform the calculation for the defective line recorded in the defective line recording memory 903 at this time. This will be described in detail later.

Regarding the defective line information that is recorded in the defective line recording memory 903, it is possible to obtain the defective line information by performing testing at the time of shipping the image sensor 100 and the image capturing apparatus. More specifically, as described above, it is possible to extract a line in which the image signal and the A image signal are the same, or a line in which there is no B image signal as the defective line. In this way, information regarding the line considered to be the defective line according to testing at the time of shipping is recorded in the defective line recording memory 903. Additionally, it is possible to similarly extract the defective line not only using testing at the time of shipping, but also at the time of starting up the image capturing apparatus, and the like.

The defective line information that is recorded in the defective line recording memory 903 may be other than the address of the defective line. An example of a configuration having a defective pixel recording memory and a defective line determination unit in place of the defective line recording memory 903 will be given below. The defective pixel recording memory records line and column address/addresses of defective pixel/pixels in advance. The defective line determination unit reads the defective pixel information stored in the defective pixel recording memory, counts the number of defective pixel/pixels in each line, and if the counted number of the defective pixels in a line is equal to or greater than a threshold, then the defective line determination unit determines that the line is the defective line. The calculation unit 902 does not perform the calculation for the defective line. Any of the A image signal, B image signal and general image signal of the defective pixel may be recorded. Further, the defective line determination unit may use any or all of the A image signal, B image signal and general image signal for determination.

Figure 10A:
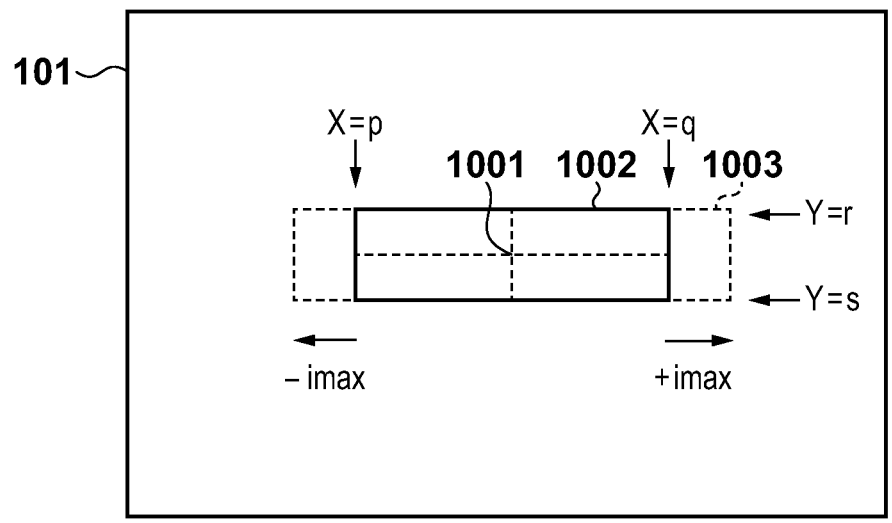
FIGS. 10A and 10B are diagrams schematically illustrating focus detection areas in the image sensor according to an embodiment.
Figure 10B:
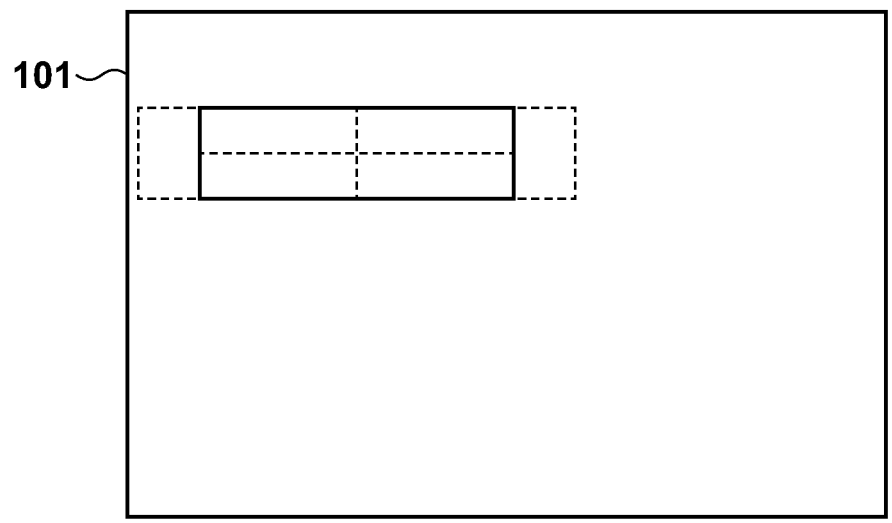

Next, a method for calculating the interval between two images, namely the A image and the B image, which is a calculation for obtaining an amount of shift from an in-focus position will be described with reference to FIGS. 10A, 10B, and 11. FIGS. 10A and 10B are diagrams showing focus detection areas in the image sensor 100. In FIG. 10A, a focus detection area 1002 indicates a range of columns p to q in the X direction and lines r to s in the Y direction centered around a point 1001. The shift amount ranges from −imax up to +imax. The actual focus detection area is the focus detection area 1003, which also includes the shift amount. FIG. 10B shows a focus detection area in the case where the focus detection is performed for a focus detection area that is different from the area shown in FIG. 10A. By setting the focus detection area in a given location in the screen as shown in FIG. 10B, it is possible to perform a calculation for obtaining the shift amount from the in-focus position at the given location on the screen.

Figure 11:
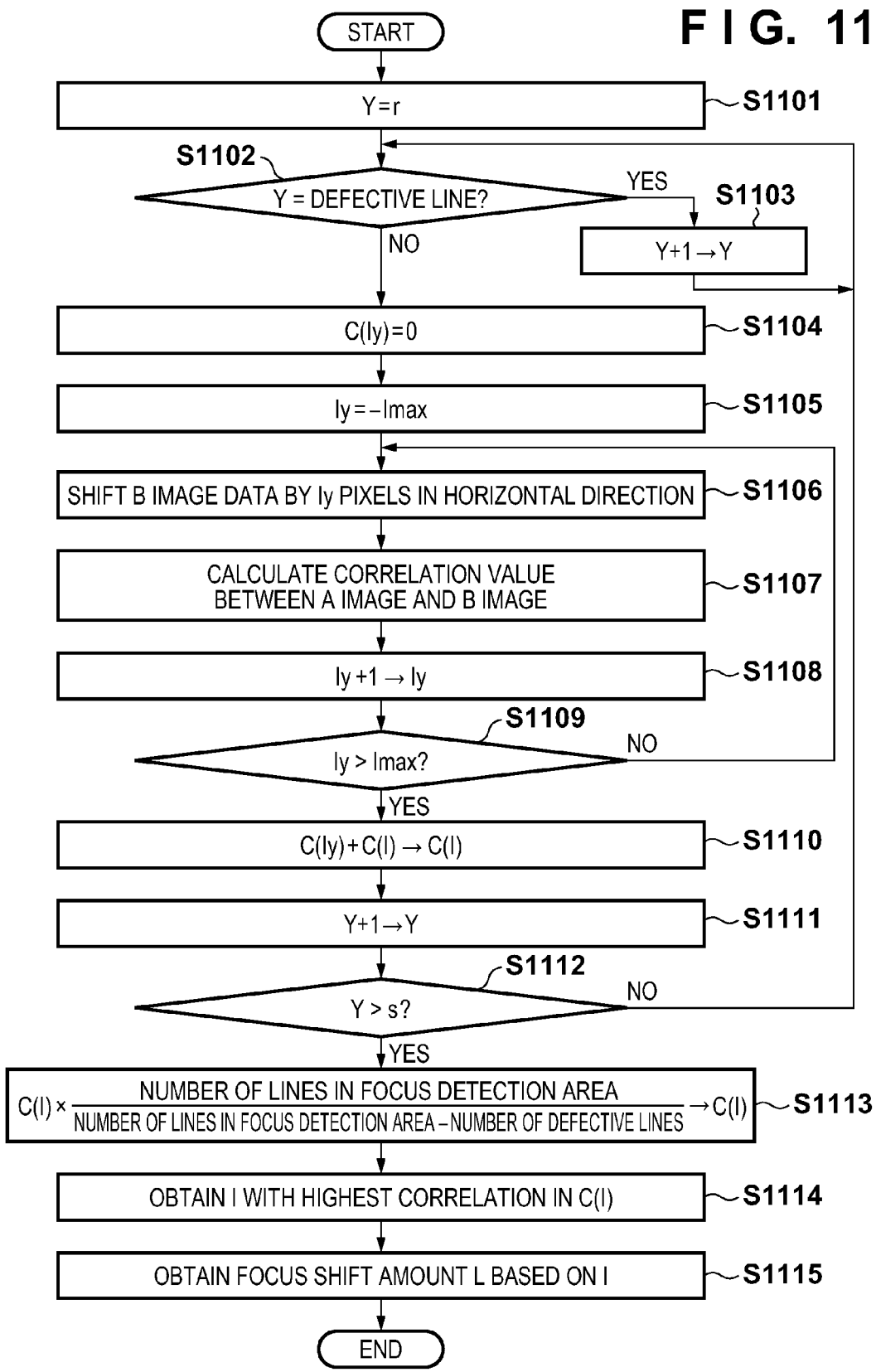
FIG. 11 is a flowchart illustrating focus detection calculation according to the first embodiment.

FIG. 11 is a flowchart showing a procedure for a calculation for obtaining not only an amount of shifting from the in-focus position, but also a focus lens movement amount based on image data obtained from the image sensor. With reference to FIG. 11, a description will be given of a focus detection calculation for obtaining an amount of shift from the in-focus position of the focus detection area that was described with reference to FIGS. 10A and 10B.

When the processing starts, the first line Y=r is selected in step S1101. Next, in step S1102, it is determined whether or not the selected line is a defective line. If the selected line is a defective line based on the defective line address information recorded in the defective line recording memory 903, the procedure moves to step S1103. In step S1103, Y is set to Y+1, the defective line is skipped, and the procedure returns to step S1102. On the other hand, if it is determined that the selected line is a normal line in step S1102, the procedure moves to step S1104. Next, in step S1104, a later-described correlation waveform C(Iy) is initialized. Next, in step S1105, Iy is set to −Imax. Since Y=line r here, the image shift amount in line r is obtained. Next, in step S1106, the pixel data of the B image is shifted by Iy pixels. Next, in step S1107, a correlation value in the case where the A image and the B image are shifted by Iy pixels is obtained.

Specifically, a correlation value is calculated by obtaining the absolute value of the difference between signal values of the pixels in the A image and the B image, as shown in equation (1) below.

$$C(Iy) = \sum_{x=p}^{q} |A_x - B_{x+Iy}| \tag{1}$$

Ax and Bx indicate the outputs of x-coordinates in the A image and the B image respectively, in designated lines. In other words, C(Iy) is the sum of the absolute values of the differences between the A image and the B image when the B image is shifted by Iy pixels. Additionally, the correlation value can be obtained using equation (2) below, for example, instead of using the above-described equation.

$$C(Iy) = \sum_{x=p}^{q} |A_{x+Iy} - B_{x-Iy}| \quad (2)$$

In equation (2) above, the sum of the absolute values of the differences is obtained not by shifting only the B image data, but by shifting the A image data at the same time in the opposite direction. At this time, in step S1106, the A image data is shifted by Iy pixels and the B image data is shifted by −Iy pixels.

Also, rather than finding the absolute value of the difference between the A line and the B line, it is possible to obtain the correlation value using equation (3) in which pixels having large pixel values are calculated as shown below.

$$C(Iy) = \sum_{x=p}^{q} \max(A_x, B_{x+Iy}) \quad (3)$$

max(A,B) represents the greater value out of A and B. It is also possible to use an equation (not shown) by which the smaller value out of A and B is selected in order to obtain the correlation value.

It is sufficient that a correlation value for the A image and the B image is obtained in this way according to the present invention, and the present invention is not limited to the method for obtaining the correlation value in step S1107.

Next, in step S1108, Iy+1 is substituted for Iy (one-pixel shift). If Iy>Imax in step S1109, the procedure moves to step S1110, and if Iy is less than or equal to Imax, steps S1106, S1107, and S1108 are repeated. Accordingly, if the procedure moves to step S1110, the correlation waveform C(Iy), which is a set of one line of correlation values from −Imax to +Imax, is obtained.

Next, in step S1110, C(Iy)+C(I) is substituted for C(I). Next, in step S1111, Y+1 is substituted for Y, and if Y>s in step S1112, the procedure moves to step S1113, and if not, the procedure returns to step S1102 and the above processing is repeated. In other words, in step S1110, C(I) is generated by adding C(Iy) of each line together, and by repeating this process for each line from r to s, the correlation waveform C(I) that includes all lines added together is obtained from the correlation waveform C(Iy) of the individual lines.

Figure 12A:
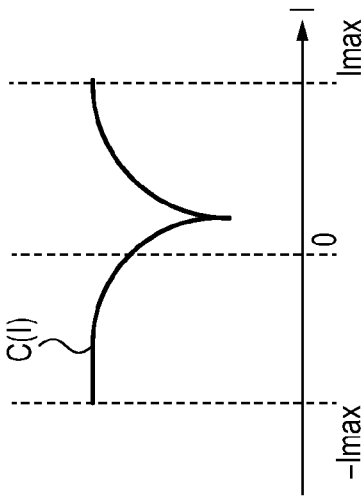
FIGS. 12A to 12C are diagrams schematically illustrating a relationship between a correlation waveform and an image shift amount.
Figure 12B:
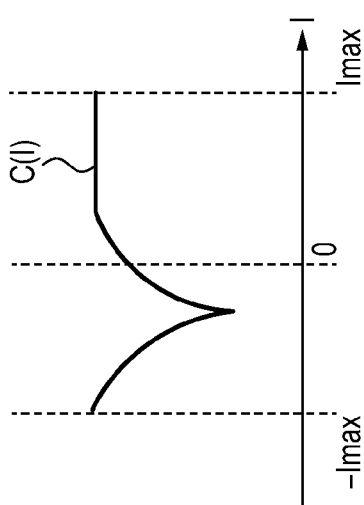
Figure 12C:
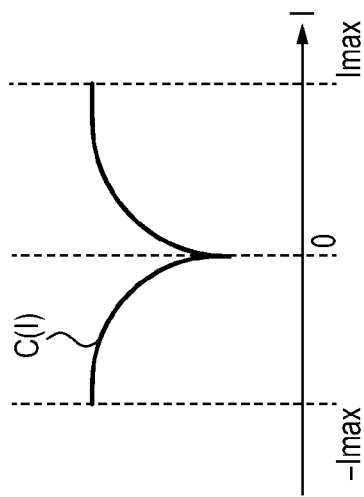

Here, the correlation waveform C(I) will be described with reference to FIGS. 12A to 12C. FIGS. 12A to 12C schematically show the correlation waveform C(I). The correlation waveform C(I) indicates correlation values between the A image and the B image in the case of shifting by a shift amount I, and if the correlation value is the sum of the absolute values of differences, the shift amount I at a location in which the output of the correlation waveform C(I) is at its lowest is the shift amount I with the highest correlation. As shown in FIG. 12A, when in-focus, the shift amount I with the highest correlation, or in other words, the shift amount I at the location where the output of the correlation waveform C(I) is lowest in the correlation waveform C(I), is equal to 0. Additionally, as shown in FIGS. 12B and 12C, when the focus is shifted, the correlation is the highest at the shift amount I based on the amount of shift of focus. In other words, the shift amount at the location where correlation is the highest has the same value as the image shift amount.

Next, in step S1113, the correlation waveform C(I) that has been obtained by the processing by the end of step S1112 is normalized. Since the defective line is skipped according to the processing of steps S1102 and S1103, there is a difference between the correlation waveform C(I) in the case where there is a defective line and the correlation waveform C(I) in the case where there is no defective line. In view of this, in step S1113, a new C(I) is obtained using the following calculation: "C(I)×number of lines in focus detection area/(number of lines in focus detection area−number of defective lines)", and thus, regardless of whether or not a defective line exists, the same C(I) is always obtained under the same conditions. By doing this, a highly accurate C(I) is obtained, but if the time or hardware for calculation processing is insufficient, the accuracy of the focus detection calculation may be reduced and the processing of step S1113 need not be performed.

Next, in step S1114, the shift amount I that has the highest correlation is obtained from the correlation waveform C(I) that was obtained by adding the correlation waveforms C(Iy) of all lines together. Specifically, as described above with reference to FIGS. 12A to 12C, the location where the shift amount I having the highest correlation, or in other words, the location where the output of the correlation waveform C(I) is the lowest is obtained. In step S1114, the image shift amount between the A image and the B image in lines r to s is calculated by obtaining the shift amount I having the highest correlation from the correlation waveform C(I). In step S1115, the obtained image shift amount is converted so as to ultimately obtain a focus shift amount L, and the processing ends. Based on the focus shift amount L, the lens is shifted by L thereby bringing it into focus, although this is not shown in the drawings.

The correlation waveform C(I) is generated in this way by obtaining the correlation waveform C(Iy) in each line and adding the correlation waveforms C(Iy) together for the number of lines in the focus detection area, and it is thereby possible to obtain a focus shift amount in the two-dimensional focus detection area shown in FIGS. 10A and 10B. Furthermore, as shown in steps S1102 and S1103, a more accurate focus detection calculation is achieved since the signals of the defective line are not included in the focus detection calculation.

As described above, according to the first embodiment, in the case where a focus detection calculation is to be performed in a two-dimensional detection area, even if a defective line, that is not present in the image signals, is present in the A image signal and the B image signal, it is possible to perform a focus detection calculation without the accuracy of the calculation being reduced due to the defective line. Accordingly, since an image sensor having a defective line in only the A image signal and the B image signal can be used for imaging, it is possible to improve yield.

Modified Example

Figure 13:
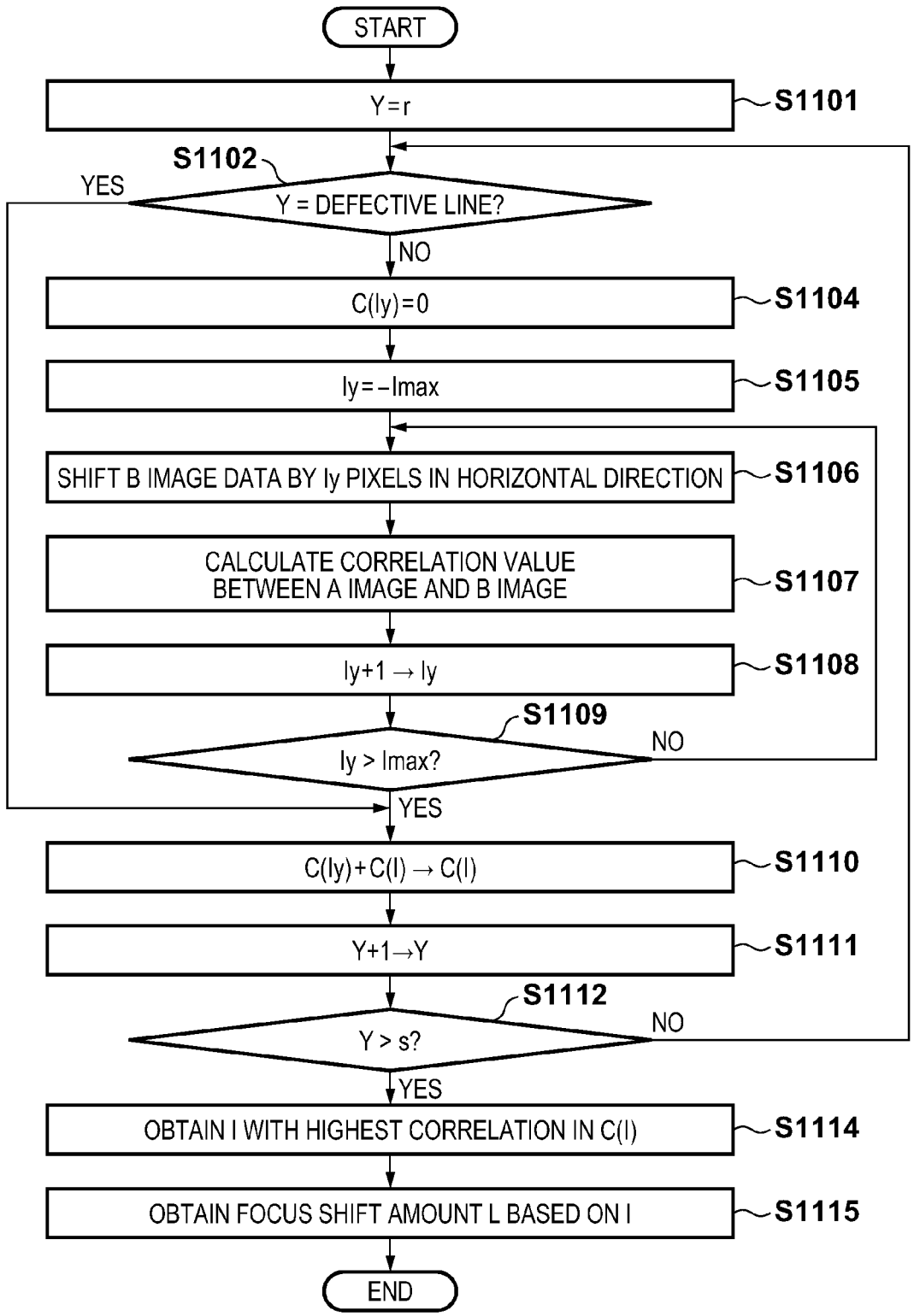
FIG. 13 is a flowchart illustrating focus detection calculation according to a modified example.

With reference to FIG. 13, a description will be given of a focus detection calculation used in place of the focus detection calculation that was described with reference to FIG. 11. In the present modified example, processing for achieving a high degree of accuracy in the focus detection calculation excluding the normalization processing of step S1113 will be described. Unlike the processing shown in FIG. 11, if it is determined in step S1102 that the selected line is a defective line, the procedure up to step S1110 is skipped in the processing shown in FIG. 13. Accordingly, since the processing for clearing C(Iy) in step S1104 is skipped, correlation waveform data for the line preceding the defective line remains when the correlation waveform C(Iy) of the defective line is to be added to the correlation waveform C(I). In other words, the defective line data is interpolated using the data of the previous line. A prerequisite for performing this processing is that defective lines are not consecutive, and this processing enables a more accurate focus detection calculation while omitting the processing of step S1113. Also, although a method for replacing C(Iy) of the defective line with the data of the previous line was mentioned here, it is also possible to replace the A image signal and B image signal of the defective line with the A image signal and B image signal of the previous line and perform a normal correlation calculation.

Additionally, a configuration is possible in which the correlation waveform C(Iy) or the A image signal and B image signal of the subsequent line is used instead of those of the line preceding the defective line, and a configuration is possible in which the average value of the correlation waveforms C(Iy) or of the A image signals and B image signals of the previous line and the subsequent line is used.

Second Embodiment

A second embodiment of the present invention will be described next. The configuration of the image sensor in the second embodiment is similar to that of the above-described first embodiment, and therefore the description thereof will not be repeated here.

Figure 14:
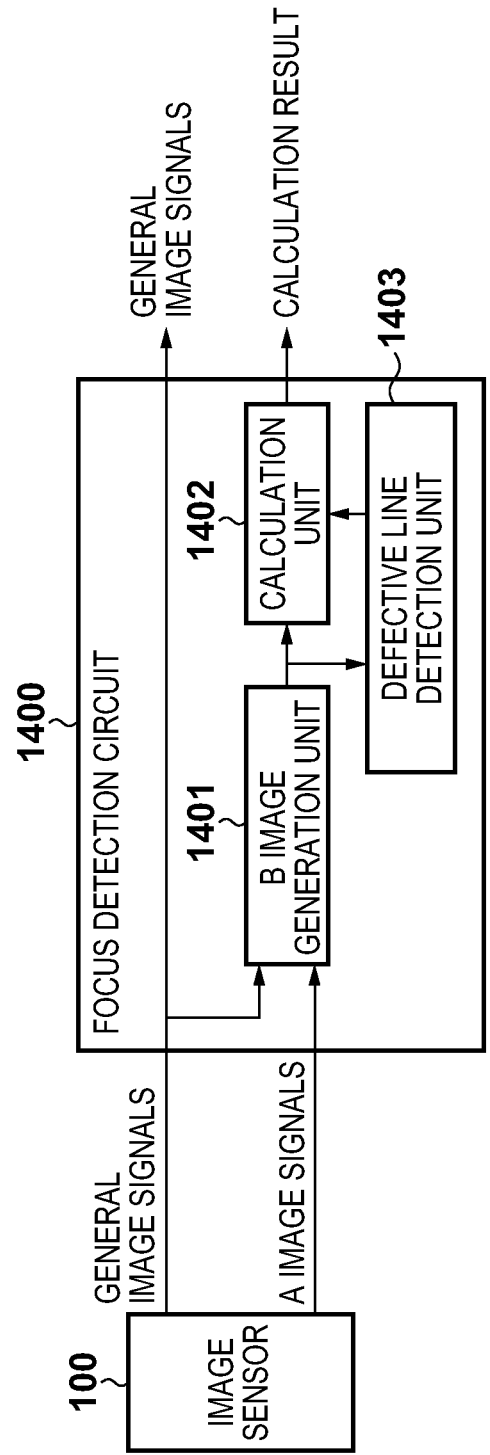
FIG. 14 is a block diagram showing a system configuration that includes an image sensor involved in focus detection according to a second embodiment.

In the second embodiment, a description will be given of a system that detects a defective line while performing the focus detection calculation rather than excluding the defective line that was detected in advance from the focus detection calculation. FIG. 14 is a system configuration diagram including the image sensor involved in phase difference detection. Although the general image signals and the A image signal are output from the image sensor 100 as described above, these signals may be output at the same time and they may be output in a time series. A focus detection circuit 1400 according to the second embodiment has a B image generation unit 1401, a calculation unit 1402, and a defective line detection unit 1403 for detecting a defective line. The focus detection circuit 1400 generates a B image signal in the B image generation unit 1401 by subtracting an A image signal from a general image signal from the image sensor 100. A later-described focus detection calculation is performed based on the A image signal and the B image signal in the calculation unit 1402, but the calculation unit 1402 does not perform the focus detection calculation with respect to defective lines detected by the defective line detection unit 1403.

FIG. 15 is a flowchart showing a procedure of a focus detection calculation for obtaining a focus lens movement amount, or in other words, an amount of shift from the in-focus state based on the general image signal and the A image signal obtained from the image sensor 100. Note that the processing of step S1101 and steps S1104 to S1115 is similar to the processing of the flowchart shown in FIG. 13.

In step S1501, the B image signal of a selected line Y are added in the column direction and are substituted for Kb in the defective line detection unit 1403. Adding is performed in the column direction so that the B image signal is accurately obtained without being disrupted by noise, and therefore the number of signals to be added may be determined according to the amount of noise. Here, B signals are present if the line is a normal line, and therefore Kb takes a value not less than a predetermined value. On the other hand, if the line is a defective line, although Kb includes noise, its value is substantially close to 0. In step S1502, Kb and a threshold value Kth are compared. A value capable of sorting between noise and signal is set to be the threshold value Kth. In other words, if Kb<Kth, it is determined that the line is a defective line. In the case of a defective line, the procedure moves to step S1110, and in the case of a normal line, the procedure moves to step S1104 and the normal correlation calculation is performed.

By detecting the defective line in real-time and excluding it from the focus detection processing in this way, memory use is reduced and there is no need to perform an inspection at the time of shipping. Note that not only is it possible to exclude the defective line from the focus detection calculation, but it is also possible to replace the correlation waveform C(Iy) or the A image signal and B image signal of the defective line with the correlation waveform C(Iy) or the A image signal and B image signal of the previous line and/or the subsequent line and perform a normal correlation calculation as described in the above modified example.

Third Embodiment

Next, a third embodiment in the case of applying the image sensor 100 that was described in the first and second embodiments to a digital camera that is an image capturing apparatus will be described with reference to FIG. 16.

In FIG. 16, zoom control, focus control, diaphragm control, and the like are performed by a lens driving unit 1602 using a lens unit 1601 that causes an optical image of a subject to be formed on the image sensor 100. A mechanical shutter 1603 is controlled by a shutter driving unit 1604. The image sensor 100 converts a subject image formed by the lens unit 1601 into image signals and outputs them. An image signal processing unit 1606 subjects image signals output from the image sensor 100 to various types of correction and compresses data. Also, the image signal processing unit 1606 executes the processing performed by the above-described focus detection circuit 900 or 1400. A timing generation unit 1607 outputs various types of timing signals to the image sensor 100 and the image signal processing unit 1606. A control circuit 1609 performs overall control of various calculations and the image capturing apparatus. A memory 1608 temporarily stores image data. A recording medium control interface (I/F) unit 1610 is used for recording in and reading out image data from a detachable recording medium 1611 such as a semiconductor memory. A display unit 1612 displays various types of information and captured images.

An operation during imaging in the digital camera having the above-described configuration will be described next. When a main power is switched on, a power of a control system is switched on, and a power for an imaging system circuit such as the image signal processing unit 1606 is furthermore switched on.

Then, when a release button (not shown) is pressed, the above-described focus detection calculation is performed based on the data from the image sensor 100, and the amount of shift from the in-focus state is calculated based on the result of the focus detection. At that time, the defective line information is obtained from a memory (not shown) and the defective line is excluded from the focus detection calculation. Alternatively, the defective line is replaced by the data of the previous line. Subsequently, the lens unit 1601 is driven by the lens driving unit 1602 and it is determined whether or not it is in focus, and if it is determined that it is not in focus, the lens unit 1601 is driven and the focus detection calculation is performed once again.

Then, after it has been confirmed that the lens is in focus, the imaging operation is started. When the imaging operation ends, the image signals output from the image sensor 100 undergo image processing in the image signal processing unit 1606 and are written in the memory 1608 by the control circuit 1609. Permuting processing, addition processing, and selection processing are performed in the image signal processing unit 1606. The data that has stored in the memory 1608 is recorded in the detachable recording medium 1611 such as a semiconductor memory via the recording medium control I/F unit 1610 according to control performed by the control circuit 1609.

Additionally, the image may be input directly to a computer or the like via an external I/F unit (not shown) and manipulated.

Other Embodiments

Furthermore, although a case was described in the above embodiments in which each pixel has two photoelectric conversion elements, the present invention is not limited to this configuration. The present invention may be applied in the case where each pixel includes four photoelectric conversion elements for example, and two vertically or horizontally adjacent pixels are added together and read out at a time. Thus, the present invention is not limited to the number of photoelectric conversion elements included in each pixel.

The present invention is applicable to a configuration having pixels, arranged two-dimensionally, capable of separately acquiring information from light beams exiting an exit pupil of an imaging lens in an image sensor in which a defective line is present in an image used for phase difference detection, but a defective line is not present in the captured image.

Note that the present invention may be applied to a system configured by multiple devices (e.g., a host computer, an interface device, a camera head, and the like), and it may be applied to an apparatus comprised of one device (e.g., a digital camera or the like).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-000732, filed on Jan. 7, 2013, which is hereby incorporated by reference herein in its entirety.

What is claimed is:

1. An image capturing apparatus comprising:
an image sensor that includes a plurality of pixels, each including a plurality of photoelectric conversion elements, and is capable of separately reading out signals by divided portions of the plurality of photoelectric conversion elements;
a readout unit configured to read out a signal from a portion of the photoelectric conversion elements of each pixel as a first signal and read out a sum of signals from the plurality of photoelectric conversion elements of each pixel as an image signal;
a generation unit configured to generate a second signal for each pixel, using the image signal and the first signal; and
a calculation unit configured to calculate a moving amount of a focus lens included in an imaging lens for achieving an in-focus state, based on a phase difference between the first signal and the second signal,
wherein the calculation unit performs the calculation without using a signal from a defective line that includes a pixel that cannot generate the second signal using the image signal and the first signal.

2. The image capturing apparatus according to claim 1, further comprising:
a storage unit configured to store the defective line in advance,
wherein the calculation unit performs the calculation without using a signal from the defective line stored in the storage unit.

3. The image capturing apparatus according to claim 1, further comprising:
a determination unit configured to determine that a line is the defective line if a value obtained by adding up the second signal generated by the generation unit for each line is smaller than a predetermined threshold value,
wherein the calculation unit performs the calculation without using signals from the defective line that was determined by the determination unit.

4. The image capturing apparatus according to claim 1, wherein the calculation unit calculates a correlation value between the first signal and the second signal for each line and obtains the phase difference using the correlation value of at least one of the line preceding the defective line or the line subsequent to the defective line in place of the correlation value of the defective line.

5. The image capturing apparatus according to claim 1, wherein the calculation unit obtains the phase difference using the first signal value and the second signal value of at least one of the line preceding the defective line or the line subsequent to the defective line in place of the first signal value and the second signal value of the defective line.

6. The image capturing apparatus according to claim 1, wherein the calculation unit performs the calculation with respect to pixels included in a predetermined focus detection area and obtains the phase difference based on the sum of the correlation values between the first signal and the second signal that were calculated for each line in the focus detection area, and if the focus detection area includes a defective line, the sum of the correlation values is normalized according to the number of lines included in the focus detection area, and a phase difference is obtained based on the normalized correlation values.

7. The image capturing apparatus according to claim 1, wherein the plurality of photoelectric conversion elements included in each pixel receive light that has passed through different pupil areas of the imaging lens.

8. A method for controlling an image capturing apparatus including an image sensor that includes a plurality of pixels, including a plurality of photoelectric conversion elements, and is capable of separately reading out signals separately by divided portions of the plurality of photoelectric conversion elements, the method comprising:
a readout step of reading out a signal from a portion of the photoelectric conversion elements of each pixel as a first signal and reading out a sum of signals from the plurality of photoelectric conversion elements of each pixel as an image signal;
a generation step of generating a second signal for each pixel, using the image signal and the first signal; and
a calculation step of calculating a moving amount of a focus lens included in an imaging lens for achieving an in-focus state, based on a phase difference between the first signal and the second signal,
wherein in the calculation step, the calculation is performed without using a signal from a defective line that includes a pixel that cannot generate the second signal using the image signal and the first signal.

* * * * *